United States Patent
Kuramochi et al.

(10) Patent No.: US 11,802,635 B2
(45) Date of Patent: Oct. 31, 2023

(54) ELECTROMAGNETIC VALVE

(71) Applicant: NIDEC TOSOK CORPORATION, Kanagawa (JP)

(72) Inventors: Kenta Kuramochi, Kanagawa (JP); Satoshi Yabushita, Kanagawa (JP); Tomohiko Nakanishi, Kanagawa (JP); Hiroki Shimizu, Kanagawa (JP); Luong Cao Dai, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 17/699,188

(22) Filed: Mar. 21, 2022

(65) Prior Publication Data
US 2022/0307623 A1 Sep. 29, 2022

(30) Foreign Application Priority Data
Mar. 29, 2021 (JP) ................................ 2021-056234

(51) Int. Cl.
*F16K 41/02* (2006.01)
*F16K 1/36* (2006.01)
*F16K 31/06* (2006.01)

(52) U.S. Cl.
CPC ................ *F16K 41/02* (2013.01); *F16K 1/36* (2013.01); *F16K 31/0655* (2013.01)

(58) Field of Classification Search
CPC .................................................. F16K 31/0655
See application file for complete search history.

(56) References Cited

U.S. PATENT DOCUMENTS

| | | | |
|---|---|---|---|
| 6,598,623 B2 * | 7/2003 | Weldon | F16K 31/0655 251/129.02 |
| 7,159,840 B2 * | 1/2007 | Young | H01F 7/088 251/64 |
| 2019/0085999 A1 | 3/2019 | Chen et al. | |

* cited by examiner

*Primary Examiner* — Eric Keasel
(74) *Attorney, Agent, or Firm* — HAUPTMAN HAM, LLP (57) ABSTRACT

An electromagnetic valve includes: a solenoid having a plunger movably supported along an axis O1 direction; a flow path member having a fluid passage flow path and a valve element housing portion; and a valve element in a columnar shape that is disposed in the valve element housing portion, is movable along the axis O1 direction together with the plunger, and can switch between an open state and a closed state. The flow path member has an abutment portion that abuts on the valve element in the valve element housing portion, and a biasing member that biases the valve element. The valve element has an enlarged-diameter portion on the radially outer side. The enlarged-diameter portion has an opposing surface portion opposing the abutment portion at least in the axis O1 direction. The opposing surface portion is in contact with the abutment portion in the open state.

14 Claims, 5 Drawing Sheets

ELECTROMAGNETIC VALVE

CROSS-REFERENCE TO RELATED APPLICATIONS

The present invention claims priority under 35 U.S.C. § 119 to Japanese Patent Application No. 2021-056234 filed on Mar. 29, 2021, the entire content of which is incorporated herein by reference.

FIELD OF THE INVENTION

The present invention relates to an electromagnetic valve.

BACKGROUND

Electromagnetic valves are known in which a flow of fluid such as gas, or water or oil, is switched, or passage and interruption of the fluid are switched. Conventional electromagnetic valves are mounted on, for example, a vehicle including an internal combustion engine such as an engine, and can switch between passage and interruption of a blow-by gas.

Such conventional electromagnetic valves each include a nozzle unit having a valve element that opens and closes a flow path through which a fluid passes, and a solenoid unit having a plunger that moves the valve element by excitation.

In the conventional electromagnetic valve, however, when the flow path is open, there is a possibility that the fluid leaks from a gap between the valve element and a guide that slides the valve element so that the solenoid unit is damaged by the influence of the fluid.

SUMMARY

Provided are: a solenoid that includes: a bobbin in a tubular shape provided with a through-hole penetrating the bobbin along an axial direction; a plunger inserted in the through-hole and movably supported along the axial direction; and a coil wound around an outer peripheral portion of the bobbin and generating a magnetic force as being energized to move the plunger in the axial direction; a flow path member that includes: a fluid passage flow path having a first flow path, a second flow path, and a relay flow path disposed between the first flow path and the second flow path to connect the first flow path and the second flow path; and a valve element housing portion having a tubular space connected to the relay flow path, the flow path member being coupled to the solenoid; and a valve element in a columnar shape that is disposed in the valve element housing portion, is movable along the axial direction together with the plunger, and is capable of switching a gap between the first flow path and the second flow path between an open state and a closed state. The flow path member has an abutment portion that abuts on the valve element in the valve element housing portion, and a biasing member that biases the valve element to another side in the axial direction. The valve element has an enlarged-diameter portion, which protrudes outward in a radial direction, on one side in the axial direction. The enlarged-diameter portion has an opposing surface portion opposing the abutment portion at least in the axial direction, and the opposing surface portion is in contact with the abutment portion in the open state.

The above and other elements, features, steps, characteristics and advantages of the present disclosure will become more apparent from the following detailed description of the preferred embodiments with reference to the attached drawings.

DETAILED DESCRIPTION

With reference to FIGS. 1 to 4, an embodiment of an electromagnetic valve of the present invention will be described. In the following description, three axes orthogonal to each other are set as an X-axis, a Y-axis, and a Z-axis for convenience of description. As an example, an XY-plane including the X-axis and the Y-axis is horizontal, and the Z-axis is vertical. A direction parallel to the X-axis may be referred to as an "axial direction (axis O1 direction)", a radial direction centered on this axis may be simply referred to as a "radial direction", and a circumferential direction centered on the axis may be simply referred to as a "circumferential direction". Further, a positive side in an X-axis direction may be referred to as "one side in the axial direction" or simply as "one side", and a negative side in the X-axis direction may be referred to as the "other side in the axial direction" or simply as "the other side". In the present specification, a vertical direction, a horizontal direction, an upper side, and a lower side are simply names for describing a relative positional relation of each part, and thus, an actual placement relation or the like may be a placement relation or the like other than the placement relation or the like indicated by these names.

Figure 1:
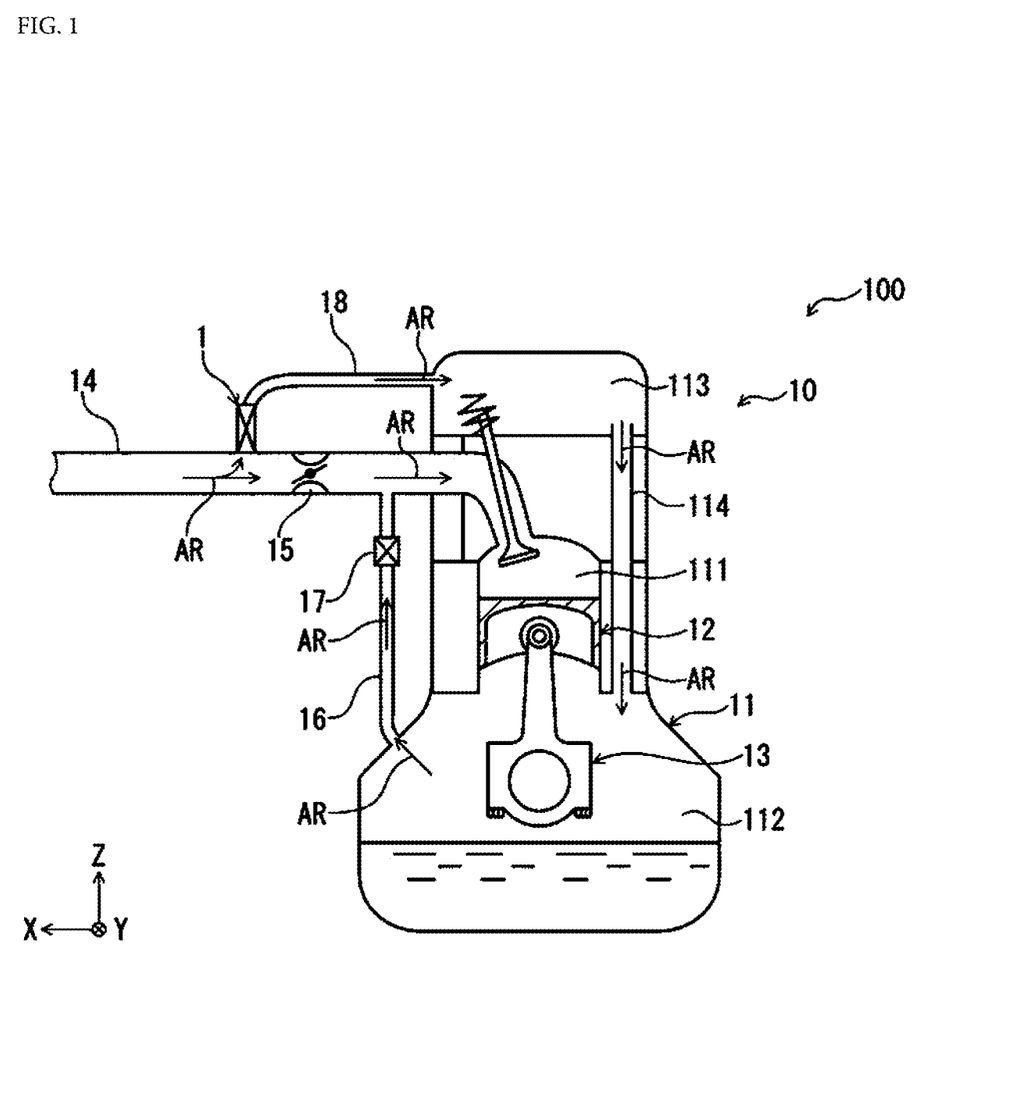
FIG. 1 is a diagram illustrating an example of a use state of an electromagnetic valve (open state) of the present invention.
Figure 2:
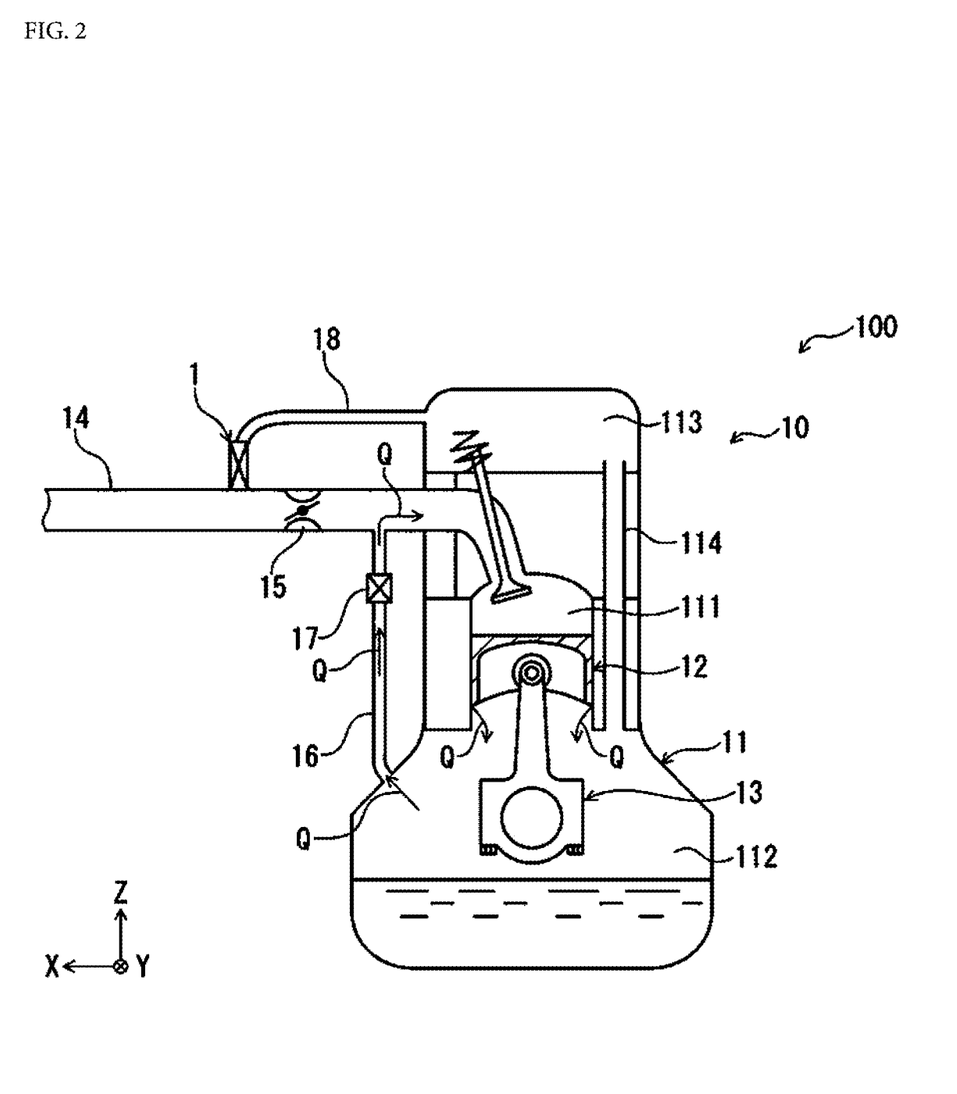
FIG. 2 is a diagram illustrating an example of a use state of the electromagnetic valve (closed state) of the present invention.

As illustrated in FIGS. 1 and 2, an electromagnetic valve 1 is used by being mounted on a vehicle 100 including an internal combustion engine 10 such as an engine, for example. The internal combustion engine 10 includes a housing 11 having a combustion chamber 111, a crank chamber 112, and a buffer chamber 113, a piston 12 movably provided in the combustion chamber 111, and a crank 13 provided in the crank chamber 112 to convert reciprocating motion of the piston 12 into rotational motion.

In the housing 11, the crank chamber 112 and the buffer chamber 113 are connected using an internal flow path 114.

To the combustion chamber 111, an external flow path 14 is connected from outside the housing 11. The external flow path 14 is provided midway with an electromagnetic valve 15 that is a throttle valve.

The external flow path 14 has a downstream side from the electromagnetic valve 15, being connected to the crank chamber 112 using a first auxiliary flow path 16. The first auxiliary flow path 16 is provided midway with an electromagnetic valve 17 that is a PCV valve.

The external flow path 14 has an upstream side from the electromagnetic valve 15, being connected to the buffer chamber 113 using a second auxiliary flow path 18. The second auxiliary flow path 18 is provided with the electromagnetic valve 1 of the present invention at a boundary portion between the external flow path 14 and the second auxiliary flow path 18. The electromagnetic valve 1 switches opening and closing of the external flow path 14. The electromagnetic valve 1 causes the external flow path 14 (see FIG. 1) to be an open state during normal traveling of the vehicle 100, and causes the external flow path 14 (see FIG. 2) to be a closed state during leak detection for detecting a leak of a gaseous mixture AR or the like (hereinafter, simply referred to as a "leak").

As illustrated in FIG. 1, the open state allows the gaseous mixture AR to pass through the external flow path 14 to flow into the combustion chamber 111, and then the gaseous mixture AR is subjected to combustion. This enables the piston 12 to move. A part of the gaseous mixture AR passing through the external flow path 14 flows into the second auxiliary flow path 18 from the middle of the external flow path 14, and sequentially passes through the buffer chamber 113 and the internal flow path 114 to reach the crank chamber 112. The gaseous mixture AR having flowed into the crank chamber 112 can return to the external flow path 14 through the first auxiliary flow path 16.

As illustrated in FIG. 2, the closed state allows supply of the gaseous mixture AR to the internal combustion engine 10 to be stopped. When the combustion chamber 111 has high pressure due to combustion, a part of a blow-by gas Q in the combustion chamber 111 passes through the piston 12 to flow into the crank chamber 112. After that, the blow-by gas Q in the crank chamber 112 flows into the external flow path 14 through the first auxiliary flow path 16. At this time, when no leak occurs, pressure in the crank chamber 112 decreases with time. When the pressure in the crank chamber 112 falls below a threshold value, it is determined that no leak has occurred. In contrast, when leak occurs, the pressure in the crank chamber 112 does not decrease to be prevented from falling below the threshold value, or the pressure is likely to decrease gently to take time to fall below the threshold value. In this case, it is determined that the leak has occurred.

Figure 3:
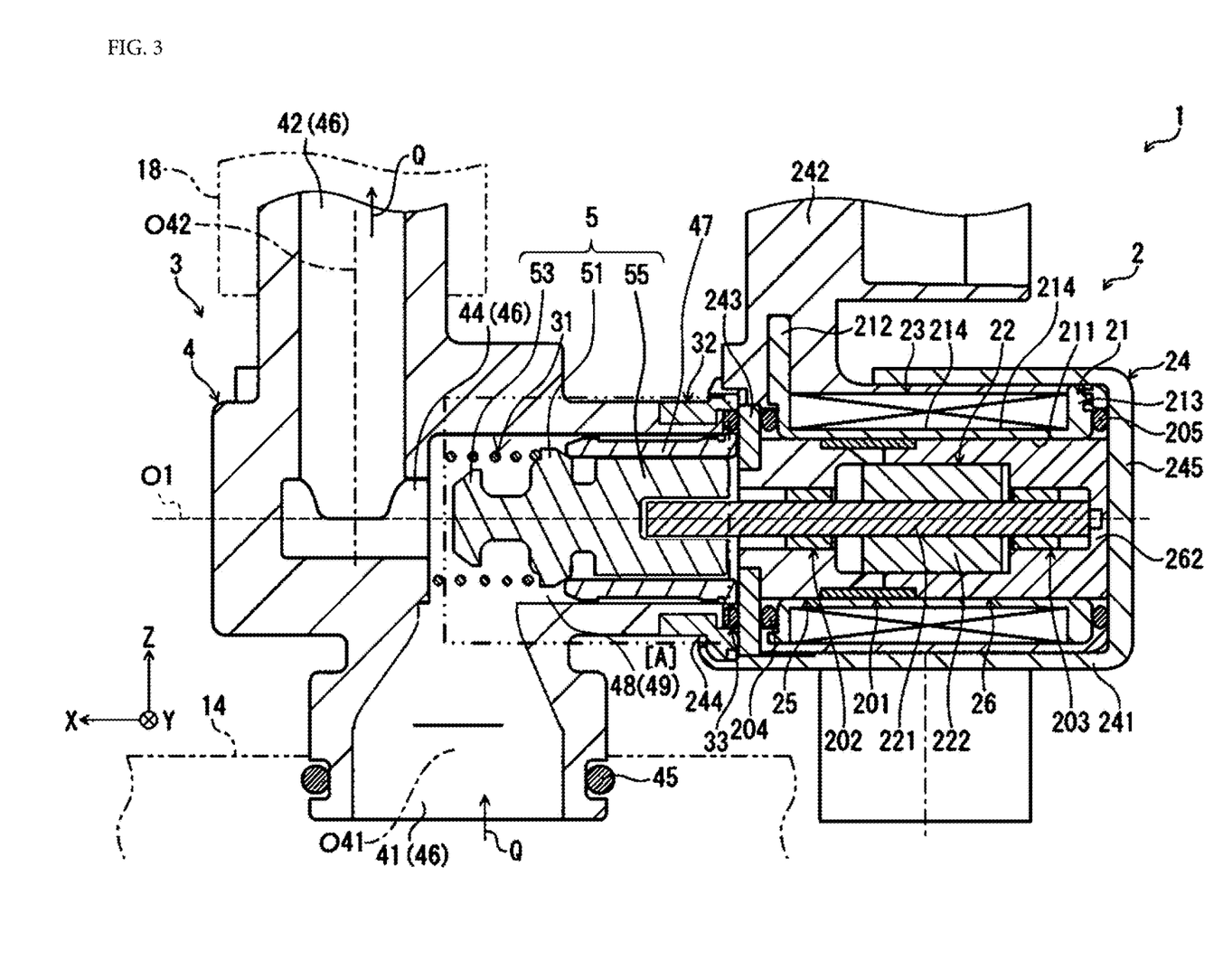
FIG. 3 is a sectional view illustrating an embodiment of the electromagnetic valve of the present invention.

As illustrated in FIG. 3, the electromagnetic valve 1 includes a solenoid 2 disposed on the negative side in the X-axis direction and a valve mechanism 3 disposed on the positive side in the X-axis direction. Hereinafter, a configuration of each part will be described.

The solenoid 2 includes a bobbin 21, a plunger 22, a coil 23, a case 24, a core 25, and a yoke 26.

The bobbin 21 is a tubular member provided with a through-hole 211. The through-hole 211 penetrates the bobbin 21 along the axis O1 direction parallel to the X-axis direction. The through-hole 211 has an inner diameter that is constant along the axis O1 direction. The bobbin 21 is provided on one side with a flange 212 protruding in the radial direction and on the other side with a flange 213 protruding in the radial direction. The bobbin 21 is made of, for example, various resin materials, such as a polyester resin and a polyimide resin.

The bobbin 21 has an outer peripheral portion 214 around which the coil 23 having conductivity is wound. When the coil 23 is brought into an energized state, or when the coil 23 is energized, a magnetic circuit is formed by the bobbin 21, the core 25, and the yoke 26 to generate a magnetic force. This enables the plunger 22 to be moved along the axis O1 direction.

The bobbin 21 has the through-hole 211 into which the core 25 and the yoke 26 are inserted, and the plunger 22 is inserted further inside.

The core 25 is disposed on one side in the axis O1 direction, and the yoke 26 is disposed on the other side in the axis O1 direction.

The core 25 has a cylindrical shape as a whole and is disposed parallel to the X-axis direction. The yoke 26 also has a cylindrical shape as a whole and is disposed parallel to the X-axis direction. The core 25 and the yoke 26 are each made of a soft magnetic material such as iron, or made of a soft magnetic metal material. As a result, it is possible to generate a magnetic circuit in a level allowing the plunger 22 to be sufficiently moved.

The solenoid 2 includes a coupling member 201 that couples the core 25 and the yoke 26 in a separated state in the through-hole 211. The coupling member 201 has a cylindrical shape, and is fitted inside with the other end portion of the core 25 and one end portion of the yoke 26. The coupling member 201 is made of a non-magnetic metal material having resistance to rust, such as austenitic stainless steel.

The plunger 22 is disposed over the core 25 and the yoke 26, and is supported to be alternately movable to one side and the other side along the axis O1 direction, or to be able to reciprocate.

The plunger 22 includes a plunger body 222 in a cylindrical shape and a plunger pin 221 inserted in the plunger body 222. The plunger pin 221 protrudes to both the one side and the other side in the axis O1 direction. The yoke 26 has the other side closed by a wall portion 262, and the plunger pin 221 comes into contact or collides with the wall portion 262, and thus, a movement limit of the plunger 22 to the other side is restricted.

The plunger 22 is configured such that the plunger pin 221 is supported by a bush 202 in the core 25, and the plunger pin 221 is supported by a bush 203 in the yoke 26. This enables the plunger 22 to smoothly reciprocate.

The case 24 houses the bobbin 21, the plunger 22, the coil 23, the core 25, and the yoke 26. The case 24 includes a case body 241, a connector member 242, and a ring member 243.

The case body 241 has a bottomed tubular shape. That is, the case body 241 is a tubular member having an opening portion 244 opened on its one side in the axis O1 direction and a wall portion 245 closing its other side. The yoke 26 is in contact with the wall portion 245 from the one side.

The ring member 243 has an annular shape, and is disposed on the radially outer side of the core 25 to be concentric with the core 25. The ring member 243 is in contact with the core 25 from the one side.

The case body 241 and the ring member 243 are each made of a soft magnetic metal material such as iron similarly to the core 25.

The connector member 242 is connected to a connector (not illustrated) used for energizing the coil 23. The connector member 242 is made of, for example, a resin material, which is similar to the bobbin 21.

The solenoid 2 includes a gasket 204, disposed between the ring member 243 and the flange 212 of the bobbin 21, and a gasket 205, disposed between the wall portion 245 of the case body 241 and the flange 213 of the bobbin 21, inside the case 24.

The gasket 204 has a ring shape, and is disposed on an outer peripheral side of the core 25 to be concentric with the core 25. The gasket 204 is compressed between the ring member 243 and the flange 212 of the bobbin 21, thereby enabling sealing between the ring member 243 and the flange 212.

The gasket 205 has a ring shape, and is disposed on the radially outer side of the yoke 26 to be concentric with the yoke 26. The gasket 205 is compressed between the wall portion 245 of the case body 241 and the flange 213 of the bobbin 21, thereby being able to seal between the wall portion 245 and the flange 213.

The gasket 204 and the gasket 205 are each made of an elastic material. The elastic material is not particularly limited, and examples thereof include various rubber materials such as urethane rubber and silicone rubber.

The valve mechanism 3 includes a flow path member 4, a valve element 5, a spring 31, a coupling member 32, and a gasket 33.

The flow path member 4 is coupled to the solenoid 2, and includes a fluid passage flow path 46 through which the blow-by gas Q, which is a fluid, can pass, and a valve element housing portion 49 communicating with the fluid passage flow path 46. Note that the flow path member 4 is made of, for example, a resin material, which is similar to the bobbin 21.

The fluid passage flow path 46 includes a first flow path 41, a second flow path 42, and a relay flow path 44 connecting the first flow path 41 and the second flow path 42.

The first flow path 41 is provided along the Z-axis direction and opens to the negative side in the Z-axis direction. The first flow path 41 is connected to the external flow path 14 to communicate with the combustion chamber 111 through the external flow path 14. The flow path member 4 is provided with a gasket 45 fitted from outside to seal a gap between the flow path member 4 and a pipe constituting the external flow path 14.

The second flow path 42 is also provided along the Z-axis direction and opens to the positive side in the Z-axis direction. The second flow path 42 has a central axis O42 located on the positive side in the X-axis direction with respect to a central axis O41 of the first flow path 41. The second flow path 42 is connected to, for example, the second auxiliary flow path 18.

Between the first flow path 41 and the second flow path 42, the relay flow path 44 is provided along the X-axis direction, or the axis O1 direction. The relay flow path 44 connects the first flow path 41 and the second flow path 42. For example, when the internal combustion engine 10 equipped with the electromagnetic valve 1 is a natural intake type engine, the blow-by gas Q flows from the first flow path 41 toward the second flow path 42 through the relay flow path 44 as illustrated in FIG. 3.

The valve element housing portion 49 is disposed adjacent to the fluid passage flow path 46 on the negative side in the X-axis direction. The valve element housing portion 49 has a tubular space 48 provided along the X-axis direction. The valve element 5 is housed in the tubular space 48 to be movable along the X-axis direction (axis O1 direction).

The tubular space 48 communicates with the relay flow path 44 on the positive side in the X-axis direction and communicates with the first flow path 41 on the negative side in the Z-axis direction (radially outside). When flowing from the first flow path 41 toward the second flow path 42, the blow-by gas Q passes through the tubular space 48 and the relay flow path 44 in this order.

As illustrated in FIG. 3, the coupling member 32 is disposed on the negative side in the X-axis direction of the valve element housing portion 49. The coupling member 32 has a ring shape and is fixed on an outer peripheral side (radially outer side) of the valve element housing portion 49. The case body 241 of the solenoid 2 is fixed to the coupling member 32 by crimping, for example. This causes the solenoid 2 and the flow path member 4 to be coupled to each other.

The gasket 33 is disposed between the flow path member 4 and the ring member 243 of the solenoid 2 while being compressed. The gasket 33 has a ring shape and is provided to be concentric with the valve element housing portion 49. The gasket 33 can seal between the flow path member 4 and the ring member 243, so that the leak of the blow-by gas Q from between them, or between the flow path member 4 and the solenoid 2, can be prevented. Note that the gasket 33 is made of, for example, an elastic material such as urethane rubber, which is similar to the gasket 204.

Figure 5:
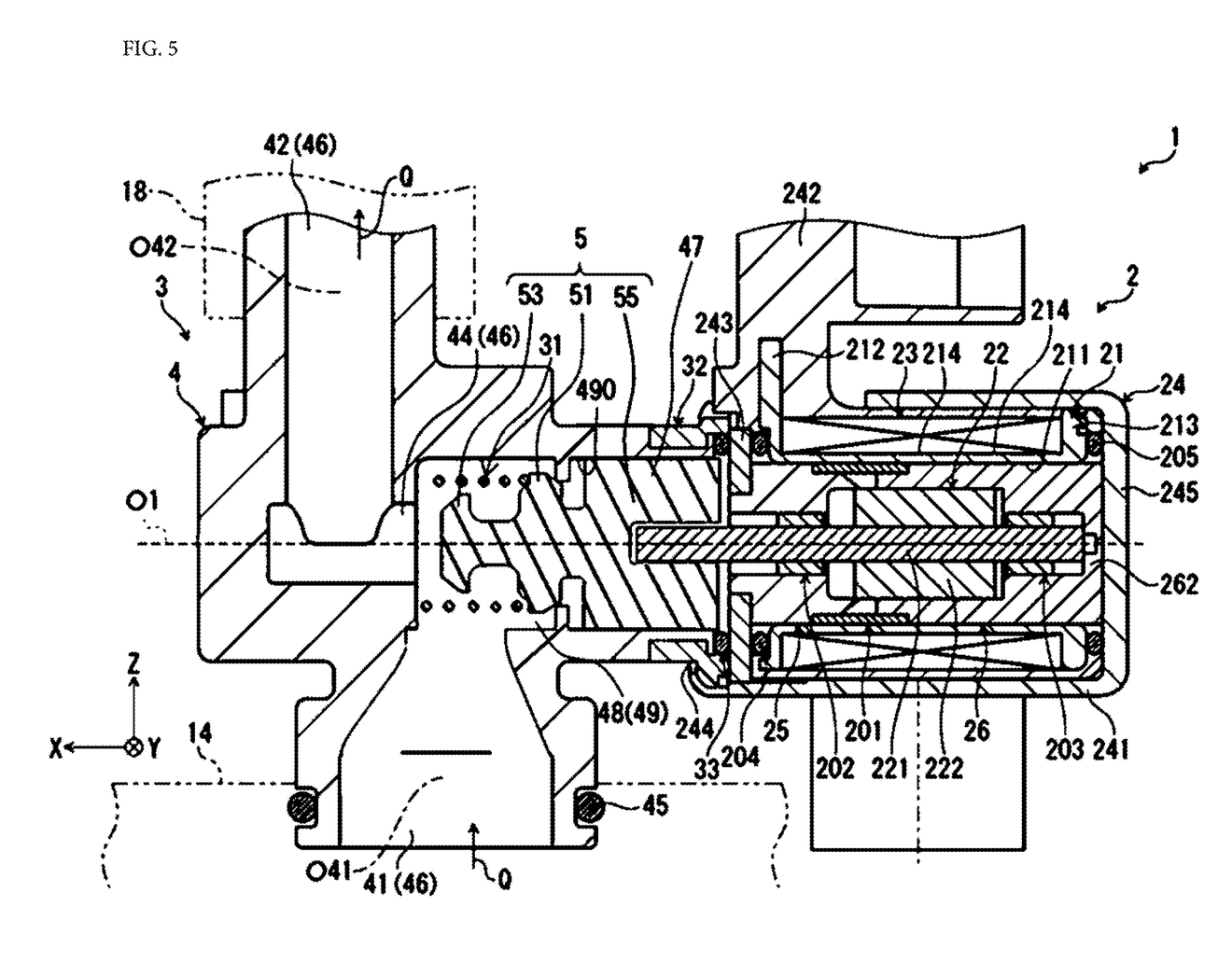
FIG. 5 is a sectional view illustrating another embodiment of the electromagnetic valve of the present invention.

Further, the valve element housing portion 49 has an abutment portion that abuts on the valve element 5. Note that the abutment portion may be provided on another member (a tubular member 47) disposed in the valve element housing portion 49. As another embodiment, the abutment portion may be a convex member protruding inward in the radial direction from an inner side surface 490 of the valve element housing portion 49 as illustrated in FIG. 5. Hereinafter, a configuration including the another member (tubular member 47) will be described.

Figure 4:
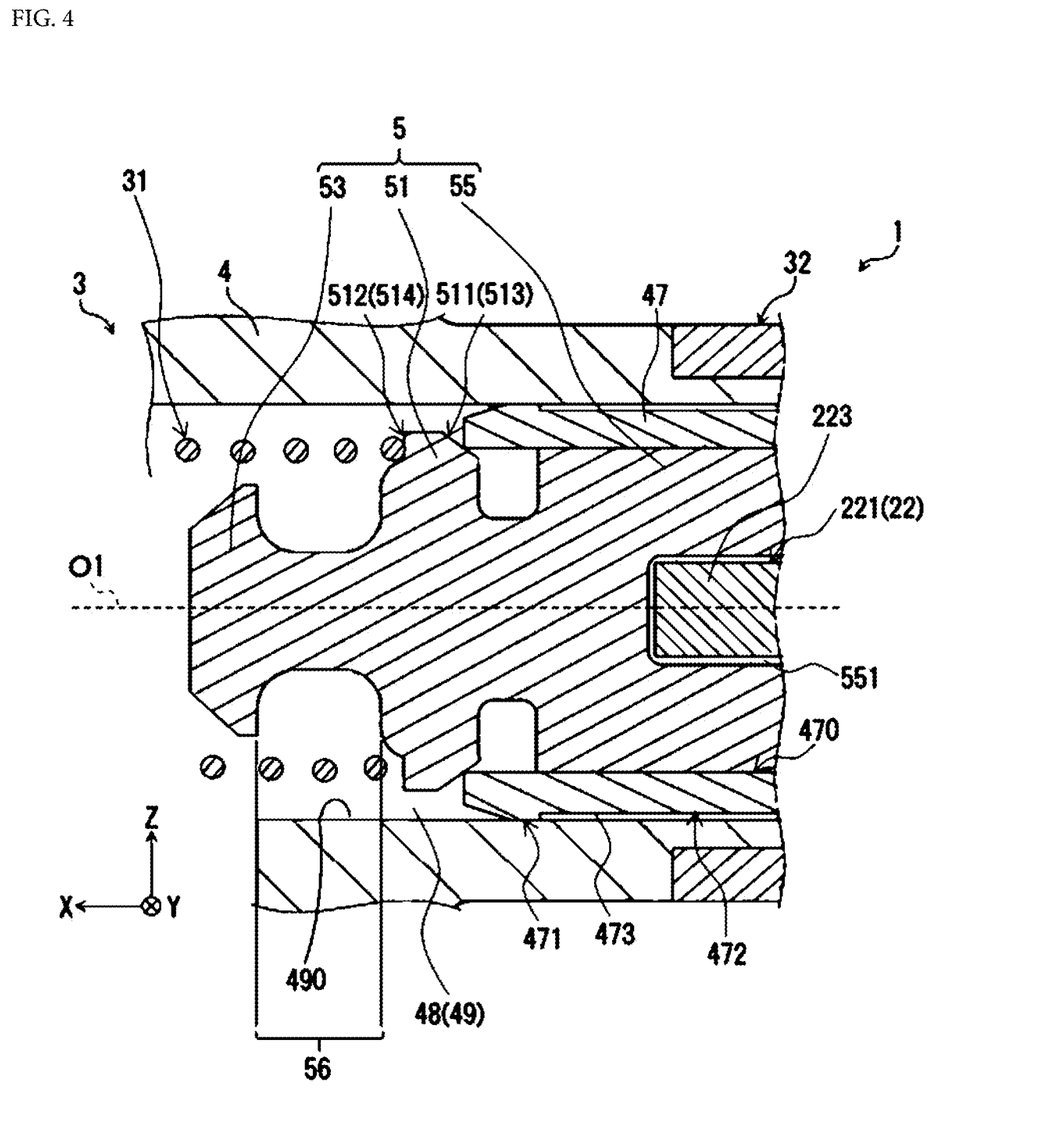
FIG. 4 is enlarged views of a region [A] surrounded by a two-dot chain line in FIG. 3.

As illustrated in FIG. 4, when the abutment portion is the another member, the inner side surface 490 of the valve element housing portion 49 constitutes a flat surface. That is, the inner side surface 490 has no irregularity, step, or the like. Therefore, the another member can brought into evenly contact with the inner side surface 490 along the circumferential direction.

As illustrated in FIG. 4, the tubular space 48 has a tubular shape and has the tubular member 47 provided to be concentric with respect to the tubular space 48.

The tubular member 47 has an inner peripheral surface 470, and the inner peripheral surface 470 can support the valve element to be slidable. As a result, the tubular member 47 can reduce the contact resistance between the valve element housing portion 49 and the valve element 5. Therefore, the need for tightening the processing accuracy of the inner side surface 490 of the valve element housing portion 49 decreases so that the processing becomes easy.

As illustrated in FIG. 3, the tubular member 47 comes into contact with the valve element 5 on the positive side in the X-axis direction (one side in the axis O1 direction) and comes into contact with the ring member 243 of the solenoid 2 on the negative side in the X-axis direction (the other side in the axis O1 direction).

As illustrated in FIG. 4, the tubular member 47 has a fitting portion 471 that is fitted to the inner side surface 490 of the valve element housing portion 49. It is preferable to provide two or more fitting portions 471. For example, one fitting portion 471 is provided on the one side in the axis O1 direction of the tubular member 47, and the other fitting portion 471 is provided on the other side in the axis O1 direction via a gap portion 473. Note that it is preferable that the fitting portion 471 have an annular brim shape continuously provided along the circumferential direction of an outer peripheral surface 472 of the tubular member 47. The fitting includes interference fit, a transition fit, and a clearance fit, but it is preferable to use those having an interference fit relation. As a result, a gap between the valve element housing portion 49 and the tubular member 47 can be sealed. As illustrated in FIG. 3, the fitting portion 471 may be fitted to the gasket 33 installed in the valve element housing portion 49. As a result, the gasket 33 can be pressed outward in the radial direction, and a gap between the flow path member 4 and the ring member 243 can be sealed with higher airtightness.

As illustrated in FIG. 4, the outer peripheral surface 472 from an end surface of the tubular member 47, orthogonal to the axial direction on the one side in the axis O1 direction to the fitting portion 471 is preferably a tapered surface whose diameter increases from the one side in the axis O1 direction to the other side in the axis O1 direction. This improves the assemblability so that manufacturing becomes easy.

As illustrated in FIG. 4, the valve element 5 is housed in the valve element housing portion 49. The valve element 5 can move along the axis O1 direction together with the plunger 22. When the valve element 5 moves, the relay flow path 44 can be opened or closed, that is, the relay flow path 44 can be switched between the open state and the closed state as illustrated in FIG. 3. The open state enables passage of the blow-by gas Q in the fluid passage flow path 46. FIG. 3 illustrates the open state. In contrast, the closed state blocks the passage of the blow-by gas Q in the fluid passage flow path 46.

The valve element 5 has an enlarged-diameter portion 51, a valve portion 53, and a protruding portion 55.

The valve element 5 has a columnar shape, and is disposed in the valve element housing portion 49 (tubular space 48) in an attitude in which a central axis thereof is parallel to the axis O1. For example, the valve element 5 is made of, for example, a resin material, which is similar to the bobbin 21.

As illustrated in FIG. 4, the enlarged-diameter portion 51 protrudes outward in the radial direction and is provided on one side in the axis O1 direction of the valve element 5. The enlarged-diameter portion 51 has, for example, a shape protruding outward in the radial direction.

The enlarged-diameter portion 51 has an opposing surface portion 511 and a contact portion 512.

The opposing surface portion 511 is provided on the other side in the axis O1 direction of the enlarged-diameter portion 51 opposing the tubular member 47 (abutment portion) in the axis O1 direction, and is in contact with the tubular member 47 (abutment portion) in the open state. This enables sealing between the enlarged-diameter portion 51 and the tubular member 47 (abutment portion), and the blow-by gas Q containing impurities can be prevented from flowing into the solenoid 2 side even in the open state. That is, the solenoid 2 is prevented from being damaged by the blow-by gas Q.

Further, the opposing surface portion 511 has a tapered surface portion 513 inclined in a direction in which its outer diameter decreases from one side in the axis O1 direction to the other side in the axis O1 direction.

The tapered surface portion 513 is in contact with an end portion of the tubular member 47 on the one side in the axis O1 direction in the open state. This enables the enlarged-diameter portion 51 to enter the tubular member 47 so that the tubular member 47 can be sealed with higher airtightness. Note that the end portion of the tubular member 47 on the one side in the axis O1 direction includes one having an area, and is a surface that can be visually recognized, for example, in a front view of FIG. 3.

The opposing surface portion 511 is in line contact with the tubular member 47 in the open state. This prevents the opposing surface portion 511 and the tubular member 47 from being joined by fixing or freezing in the contact state.

Further, the opposing surface portion 511 is in surface contact with the tubular member 47 in the open state. This enables the sealing between the opposing surface portion 511 and the tubular member 47 with higher airtightness when the opposing surface portion 511 and the tubular member 47 are in the contact state.

The contact portion 512 is provided on the one side in the axis O1 direction of the enlarged-diameter portion 51 opposing the coil spring 31 in the axis O1 direction. The contact portion 512 is a step portion 514 having a surface orthogonal to the axis O1 direction, and is in contact with the other side of in the axis O1 direction of the coil spring 31. The contact portion 512 is preferably provided at a position larger than an inner diameter of the coil spring 31. This enables the coil spring 31 to be stably disposed.

Further, the contact portion 512 is preferably disposed at a position overlapping at least a part of the opposing surface portion 511 when viewed from the axis O1 direction. This enables a force of the coil spring 31 to be smoothly transmitted, and the gap between the contact portion 512 and the tubular member 47 can be sealed with higher airtightness.

Note that the enlarged-diameter portion 51 may be guided to the inner side surface 490 of the valve element housing portion 49 when the valve element 5 moves. This enables the valve element 5 to move stably.

Further, the enlarged-diameter portion 51 preferably includes an annular brim shape continuously provided along the circumferential direction. This enables the sealing between the enlarged-diameter portion 51 and the tubular member 47 with higher airtightness.

The valve portion 53 is provided on the one side in the axis O1 direction of the enlarged-diameter portion 51 of the valve element 5. As moving together with the plunger 22, the valve portion 53 can approach the relay flow path 44 to close the relay flow path 44, or can separate from the relay flow path 44 to open the relay flow path 44. Therefore, the valve portion 53 functions as a member that opens and closes the relay flow path 44.

The valve portion 53 has, for example, a columnar shape or a plate shape. An outer diameter of the valve portion 53 is smaller than the inner diameter of the coil spring 31. This prevents the valve portion 53 from coming into contact with the coil spring 31, so that movement of the valve element 5 can be prevented from being hindered by the valve portion 53.

Note that the valve portion 53 may be disposed continuously with the enlarged-diameter portion 51. As a result, a disposition interval between the valve portion 53 and the enlarged-diameter portion 51 in the axial direction can be reduced, and the electromagnetic valve can be downsized. The term "being disposed continuously" means that the valve element 5 is disposed including a portion where the diameter does not change or is widened without being reduced in diameter in the axis O1 direction.

The protruding portion 55 is provided on the other side in the axis O1 direction to be separated from the enlarged-diameter portion 51 of the valve element 5, and protrudes outward in the radial direction. Further, the protruding portion 55 is a portion having a constant outer diameter along the axis O1. The protruding portion 55 is in contact with the inner peripheral surface 470 of the tubular member 47. As a result, the protruding portion 55 is guided by the inner peripheral surface 470 of the tubular member 47 to slide when the valve element 5 moves along the axis O1, so that the valve element 5 moves stably.

Further, the valve element 5 is provided with a concave portion 551 on the radially inner side of the protruding portion 55. The concave portion 551 is open to a surface of the valve element 5 on the other side in the axis O1 direction.

This enables a portion (distal end portion) 223 of the plunger pin 221 on the one side in the axis O1 direction to enter the concave portion 551 and press the valve element 5 to the one side in the axis O1 direction. Then, the valve element 5 is moved by pressing of the plunger 22, and the relay flow path 44 can be brought into a closed state.

The coil spring 31 is disposed along the X-axis direction on the positive side in the X-axis direction of the valve element 5. The coil spring 31 is a biasing member that biases the valve element 5 to the negative side in the X-axis direction.

When the energization of the coil 23 is released, the valve element 5 moves to the negative side in the X-axis direction due to a biasing force of the coil spring 31. As a result, the valve portion 53 can be separated from the relay flow path 44 to open the relay flow path 44 to form the open state.

The coil spring 31 is disposed to be concentric with the valve element 5 on the outer peripheral side of the valve element 5. The coil spring 31 of which the positive side in the X-axis direction is in contact with an end surface 491 on the positive side in the X-axis direction of the valve element housing portion 49 and the negative side in the X-axis direction is in contact with the enlarged-diameter portion 51 of the valve element 5, thereby forming a compressed state. As a result, the coil spring 31 can stably bias the valve element 5 without excess or deficiency.

When the enlarged-diameter portion is used as a spring seat, the flow path member 4 can be downsized. Further, the contact area between the coil spring 31 and the enlarged-diameter portion can be increased, and the area of a region where the deposit can adhere can be reduced.

Further, the use of the enlarged-diameter portion 51 as the spring seat contributes to downsizing of the electromagnetic valve 1, and the region where the deposit adheres can be also reduced on the positive side in the X-axis direction than the enlarged-diameter portion 51 on the valve element housing portion 49.

A separation distance between the enlarged-diameter portion 51 and the inner side surface 490 of the valve element housing portion 49 is preferably smaller than a wire diameter of the coil spring 31. As a result, it is possible to suitably prevent the coil spring 31 from entering a gap between the enlarged-diameter portion 51 and the inner side surface 490 of the valve element housing portion 49, and the coil spring 31 from coming out of the valve element 5.

However, the separation distance between the enlarged-diameter portion 51 and the inner side surface 490 of the valve element housing portion 49 is preferably as large as possible as long as being smaller than the wire diameter of the coil spring 31. As a result, a part of the deposit can be moved to the negative side in the X-axis direction of the enlarged-diameter portion 51, and thus, the amount of the deposit remaining on the positive side in the X-axis direction of the enlarged-diameter portion 51 can be further reduced.

Note that an outer diameter of the enlarged-diameter portion 51 is preferably larger than the inner diameter of the coil spring 31. As a result, it is possible to more reliably prevent the coil spring 31 from entering the gap between the enlarged-diameter portion 51 and the inner side surface 490 of the valve element housing portion 49.

In the electromagnetic valve 1, the valve element 5 is preferably as light as possible. The reason is that when the valve element 5 has a relatively large weight, the valve element 5 moves slow, or smooth operation of the valve element 5 is hindered, and thus, the switching between the open state and the closed state of the relay flow path 44 may not be performed quickly. Thus, the electromagnetic valve 1 is configured to reduce the weight of the valve element 5. Hereinafter, the configuration and effect of weight reduction will be described.

As illustrated in FIG. 4, the valve element 5 is provided with a reduced-diameter portion 56 between the valve portion 53 and the enlarged-diameter portion 51. Since the reduced-diameter portion 56 is provided in the valve element 5 in this manner, the weight of the valve element 5 can be reduced. This enables the valve element 5 to move smoothly so that the switching between the open state and the closed state of the relay flow path 44 can be performed quickly.

Although the reduced-diameter portion 56 has a substantially rectangular shape in a side view, that is, when viewed from the direction (Y-axis direction) orthogonal to the axis O1 direction in the present embodiment, the shape is not limited thereto, and may be, for example, another quadrangle such as a square, a semi-circle, or the like.

The reduced-diameter portion 56 has not only the effect of weight reduction but also an effect of promoting the smooth operation, that is, expansion and contraction operations of the spring.

As described above, the fluid passing through the fluid passage flow path 46 is the blow-by gas Q. The blow-by gas Q may contain adhesive impurities. In this case, there is a possibility that the impurities enters a gap between the valve element 5 and the spring 31 to hinder the expansion and contraction operations of the spring 31. However, the impurities having entered the gap between the valve element 5 and the spring 31 flow into the reduced-diameter portion as the valve element reciprocates. This enables the impurities to be recovered in the reduced-diameter portion 56 and retained as it is, thereby promoting the smooth expansion and contraction operations of the spring 31.

Although the electromagnetic valve of the present invention has been described with reference to the illustrated embodiment, the present invention is not limited thereto, and each part constituting the electromagnetic valve can be replaced with a part having any configuration capable of exhibiting similar functions. Further, any component may be added.

Although the electromagnetic valve 1 is mounted and used in the vehicle 100 equipped with the internal combustion engine 10, such as an engine, in the above embodiment, the application place of the electromagnetic valve is not limited to the vehicle 100. Further, the fluid that is switched between passage and interruption by the electromagnetic valve 1 is not limited to the gas (blow-by gas Q), and may be a liquid or a mixture of a gas and a liquid.

Although the electromagnetic valve 1 is configured to allow the blow-by gas Q to flow from the first flow path 41 toward the second flow path 42 in the above embodiment, the blow-by gas Q can also be allowed to flow from the second flow path 42 toward the first flow path 41 depending on a use state of the electromagnetic valve 1.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electromagnetic valve, comprising:
   a solenoid that includes:

a bobbin in a tubular shape provided with a through-hole penetrating the bobbin along an axial direction;
a plunger inserted in the through-hole and movably supported along the axial direction; and
a coil wound around an outer peripheral portion of the bobbin and generating a magnetic force as being energized to move the plunger in the axial direction;
a flow path member that includes:
a fluid passage flow path having a first flow path, a second flow path, and a relay flow path disposed between the first flow path and the second flow path to connect the first flow path and the second flow path; and
a valve element housing portion having a tubular space connected to the relay flow path, the flow path member being coupled to the solenoid; and
a valve element in a columnar shape that is disposed in the valve element housing portion, is movable along the axial direction together with the plunger, and is capable of switching a gap between the first flow path and the second flow path between an open state and a closed state,
wherein the flow path member has:
an abutment portion that abuts on the valve element in the valve element housing portion, and
a biasing member that biases the valve element to another side in the axial direction,
the valve element has an enlarged-diameter portion, which protrudes outward in a radial direction, on one side in the axial direction,
the enlarged-diameter portion has an opposing surface portion opposing the abutment portion at least in the axial direction, and the opposing surface portion is in contact with the abutment portion in the open state, and
the abutment portion is a tubular member that supports the valve element to be slidable on an inner side surface of the valve element housing portion.

2. The electromagnetic valve according to claim 1, wherein
the opposing surface portion has a tapered surface portion inclined in a direction in which an outer diameter decreases from the one side in the axial direction to said another side in the axial direction, and
the tapered surface portion is in contact with an end portion of the tubular member on the one side in the axial direction in the open state.

3. The electromagnetic valve according to claim 1, wherein the opposing surface portion is in line contact with the tubular member in the open state.

4. The electromagnetic valve according to claim 1, wherein the opposing surface portion is in surface contact with the tubular member in the open state.

5. The electromagnetic valve according to claim 1, wherein
the enlarged-diameter portion is a step portion having a surface orthogonal to the axial direction, and has a contact portion that comes into contact with the biasing member on said another side in the axial direction, and
the biasing member is disposed to be concentric with the valve element on an outer peripheral side of the valve element, is in contact with an end surface, on the one side in the axial direction, of the valve element housing portion on the one side in the axial direction, and is in contact with the enlarged-diameter portion on said another side in the axial direction.

6. The electromagnetic valve according to claim 5, wherein the opposing surface portion overlaps at least a part of the contact portion when viewed from the axial direction.

7. The electromagnetic valve according to claim 1, wherein
the valve element has a valve portion that switches the gap between the first flow path and the second flow path between the open state and the closed state,
an outer diameter of the valve portion is smaller than an inner diameter of the biasing member, and
the enlarged-diameter portion and the valve portion are disposed to include a portion in which a diameter of the valve element does not change or is widened without reduction in the diameter.

8. The electromagnetic valve according to claim 1, wherein the enlarged-diameter portion is guided to the inner side surface of the valve element housing portion when the valve element moves.

9. The electromagnetic valve according to claim 1, wherein the enlarged-diameter portion is an annular shape provided continuously along a circumferential direction.

10. The electromagnetic valve according to claim 1, wherein the tubular member includes a fitting portion that is fitted to the inner side surface of the valve element housing portion along a circumferential direction of an outer peripheral surface.

11. The electromagnetic valve according to claim 1, wherein the valve element has a protruding portion, which is provided on said another side in the axial direction to be separated from the enlarged-diameter portion and protrudes outward in the radial direction, and the protruding portion is guided to an inner peripheral surface of the tubular member when the valve element moves.

12. The electromagnetic valve according to claim 1, wherein the valve element and the tubular member are made of a resin material.

13. An electromagnetic valve, comprising:
a solenoid that includes:
a bobbin in a tubular shape provided with a through-hole penetrating the bobbin along an axial direction;
a plunger inserted in the through-hole and movably supported along the axial direction; and
a coil wound around an outer peripheral portion of the bobbin and generating a magnetic force as being energized to move the plunger in the axial direction;
a flow path member that includes:
a fluid passage flow path having a first flow path, a second flow path, and a relay flow path disposed between the first flow path and the second flow path to connect the first flow path and the second flow path; and
a valve element housing portion having a tubular space connected to the relay flow path, the flow path member being coupled to the solenoid; and
a valve element in a columnar shape that is disposed in the valve element housing portion, is movable along the axial direction together with the plunger, and is capable of switching a gap between the first flow path and the second flow path between an open state and a closed state,
wherein the flow path member has:
an abutment portion that abuts on the valve element in the valve element housing portion, and
a biasing member that biases the valve element to another side in the axial direction, the valve element has an enlarged-diameter portion, which protrudes outward in a radial direction, on one side in the axial direction, the enlarged-diameter portion has an opposing surface portion opposing the abutment portion at least in the axial direction, and the opposing surface portion is in contact with the abutment portion in the open state, and the enlarged-diameter portion is guided to an inner side surface of the valve element housing portion when the valve element moves.

14. An electromagnetic valve, comprising:
a solenoid that includes:
  a bobbin in a tubular shape provided with a through-hole penetrating the bobbin along an axial direction;
  a plunger inserted in the through-hole and movably supported along the axial direction; and
  a coil wound around an outer peripheral portion of the bobbin and generating a magnetic force as being energized to move the plunger in the axial direction;
a flow path member that includes:
  a fluid passage flow path having a first flow path, a second flow path, and a relay flow path disposed between the first flow path and the second flow path to connect the first flow path and the second flow path; and
  a valve element housing portion having a tubular space connected to the relay flow path, the flow path member being coupled to the solenoid; and a valve element in a columnar shape that is disposed in the valve element housing portion, is movable along the axial direction together with the plunger, and is capable of switching a gap between the first flow path and the second flow path between an open state and a closed state, wherein the flow path member has:
  an abutment portion that abuts on the valve element in the valve element housing portion, and
  a biasing member that biases the valve element to another side in the axial direction, the valve element has an enlarged-diameter portion, which protrudes outward in a radial direction, on one side in the axial direction, the enlarged-diameter portion has an opposing surface portion opposing the abutment portion at least in the axial direction, and the opposing surface portion is in contact with the abutment portion in the open state, and the valve element has a protruding portion, which is provided on said another side in the axial direction to be separated from the enlarged-diameter portion and protrudes outward in the radial direction, and the protruding portion is guided to an inner peripheral surface of the tubular member when the valve element moves.

* * * * *